Feb. 28, 1967 C. L. NORBUT ETAL 3,306,123
YOKE ADAPTOR FOR GEAR OR MOTOR OPERATOR
Filed June 18, 1965 2 Sheets-Sheet 2

Inventors.
Carl L. Norbut,
Robert A. Kautz
By Joseph O. Lang Atty.

United States Patent Office 3,306,123
Patented Feb. 28, 1967

3,306,123
YOKE ADAPTOR FOR GEAR OR
MOTOR OPERATOR
Carl L. Norbut and Robert A. Kautz, Chicago, Ill., assignors to Crane Co., Chicago, Ill., a corporation of Illinois
Filed June 18, 1965, Ser. No. 465,028
10 Claims. (Cl. 74—424.8)

This invention relates broadly to valve actuating means, and, more particularly, it is directed to an attachable gear unit provided with suitable adaptor means for conveniently facilitating the attachment thereof to a valve or the like device to be actuated. It is with greater particularity related to a detachable valve actuating means in which the valve yoke is preferably of a solid or integral construction as distinguished from that structure which is popularly termed by the trade as a split yoke construction.

The instant invention is especially adaptable to valves employing non-rotatable rising stems and is a further improvement or modification of U.S. Patent No. 3,034,371 issued May 15, 1962, and U.S. Patent No. 3,115,787, issued December 31, 1963.

At the outset, in order to acquire a better appreciation of the merits of this contribution, it should be understood that valve actuating mechanisms of this general type are frequently installed in the field as distinguished from the original manufacturer's assembly plant. The valves in the field often embody a variety of designs in that various concepts of different manufacturers are employed and thereby make it necessary that the detachable valve actuating mechanism must possess a wide degree of flexibility in order to meet the various installations required by said valves obtained from different sources.

Specifically, one of the problems encountered in the field is the necessity for being able to install the yoke sleeve adaptor over a relatively large retaining nut and by which means the actuating mechanism is connected to the valve. The said nut holds the yoke sleeve in substantially fixed position axially within the yoke while permitting its rotatability.

Another problem is the necessity for making such adaptation relatively economical and convenient and this is preferably obtained by means of a simple keyed connection between a yoke sleeve adaptor and said yoke sleeve.

It is therefore another important object to provide for a valve actuator in which the yoke sleeve adaptor therefor can be applied without requiring special skill by the operator in the field and yet assures of a condition in which the actuation of the valve is positively accomplished notwithstanding that the yoke is preferably of an integral cast, forged or otherwise fabricated construction in which the scope of flexibility permitted by said yoke is necessarily limited.

Another object is to provide for a valve actuating mechanism and the adaptor therefor in which the ribbing normally employed on the arms of the valve yoke provides the means for securely and relatively easily attaching said actuating mechanism to the valve.

Other objects and advantages will become more readily apparent upon proceeding with the following description read in light of the accompanying drawings, in which:

FIG. 4 is a fragmentary sectional assembly view taken on the line 4—4 of FIG. 1.

Similar reference numerals refer to similar parts throughout the several views.

Figure 1:
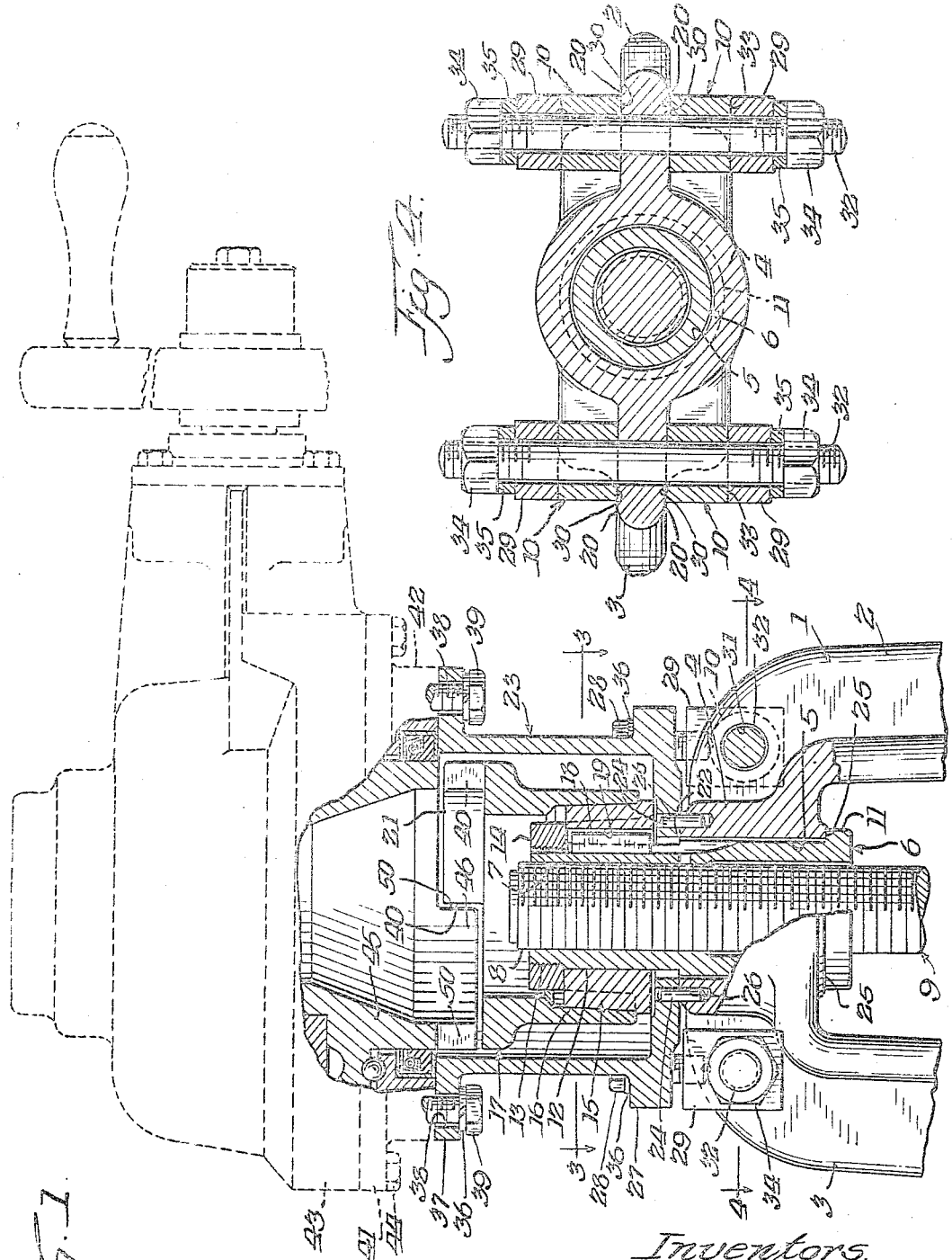
FIG. 1 is a fragmentary sectional assembly view of an adaptor element illustrative of our invention applied to an integral or one-piece yoke construction.
Figure 2:
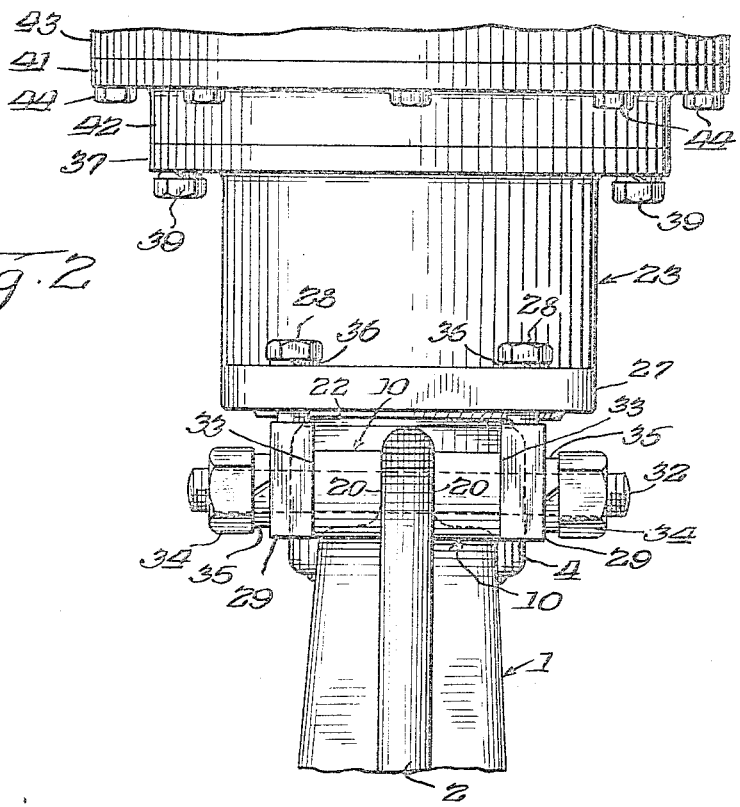
FIG. 2 is a fragmentary end exterior view showing the adaptor element of this invention in position on the valve.
Figure 3:
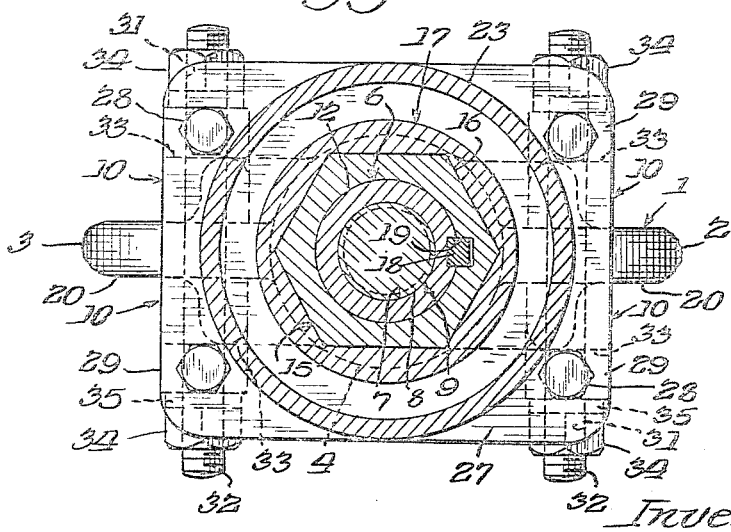
FIG. 3 is a fragmentary sectional assembly view taken on the line 3—3 of FIG. 1.

Referring now to FIG. 1, a one-piece valve yoke generally designated 1 is shown, which is attached to a valve (not shown) having the oppositely disposed depending yoke arms 2 and 3 integrally joined at their outer hub portion 4. The yoke hub in its general construction is of the type shown on page 119 of Crane Co.'s No. 60 catalog, and therefore, it is deemed unnecessary to dwell at any further length on a description of the yoke or the hub construction therefor. The yoke hub 4 is provided with a drilled-through aperture designated 5 within which the rotatable yoke sleeve generally designated 6 is inserted. The said yoke sleeve is threaded as at 7 to receive the similarly threaded portion 8 of the valve stem generally designated 9, the latter member being as what is known to the trade as the rising stem or axially movable type and non-rotatable. It is also known to those skilled in the art as the OS & Y type of valve or outside screw and yoke construction. It should be noted that the yoke sleeve 6 is inserted within the aperture 5 from the underside of the yoke hub 4 so as to shoulder at 25 with its enlarged portion 11 positioned as indicated. At its upper portion, the yoke sleeve 6 is provided with a reduced turned portion 12 together with the threads 13 forming a threaded shank for reception of the locknut 14 which bears against the yoke sleeve adaptor 15 to hold the latter member in desired axial position on said turned portion 12. The outer periphery of the yoke sleeve adaptor 15 is formed with a preferably tapered polygonal surface 16 as shown more clearly in the sectional view of FIG. 3. The latter arrangement of surfaces receives the driven adaptor generally designated 17 also shown more clearly in FIG. 3.

The yoke sleeve adaptor 15 is held in non-rotatable relation to the yoke sleeve 6 by means of the key 18 received within the keyway 19 as shown. At its upper portion, the driven adaptor 17 is provided with the arcuately extending portion 21 through a range of approximately 90° for engagement with a manual or motor driven drive as hereinafter referred to in greater detail.

Upon an upper surface portion 22 of the yoke 1, as indicated, the yoke adaptor generally designated 23 is supported, being held against rotation by means of suitably positioned alignment pins 24, which pins engage the hub portion 4 of the yoke 1 as indicated and also being received within the apertures 26 of the yoke adaptor 23. The lower portion of the yoke adaptor 23 is preferably flanged as indicated at 27 and provided with the oppositely disposed depending cap screws 28 for effecting attachment of the yoke adaptor firmly to the yoke 1. To accomplish this function, the cap screws 28 are provided with the lower lug or eyelet portions 29, the latter being tranversely apertured as at 31. The latter apertures receive the transversely extending bolt studs 32, as shown, to hold the said eyelet portions 29 against the transverse surface 33 of the circular thickened washers 10, the latter serving as filler pieces and bearing against the surface 20 of the yoke ribs as at 30. This construction is more clearly shown in the sectional view, FIG. 4. To provide for the desired attachment of the bolt studs 32, the nuts 34 together with the lock washers 35 are employed. Cooperating with the upper end of the cap screws 28, similar lock washers 36 are preferably used for the same purpose in effecting the attachment of the yoke adaptor to the yoke in the manner previously referred to.

It will be appreciated that the matter of accurately locating the yoke adaptor 23 upon the yoke hub 4 in the field is preferably done by the operator using the yoke adaptor as a drill jig in which case the tops of the pins 24 must be positioned below the surface of the yoke adaptor as shown so as not to interfere with the bottoming and proper positioning of the adaptor 23 upon the said yoke hub. In the latter connection, it should also be realized that when the holes 31 are drilled to receive the transversely positioned stud bolts 32, the latter operation is also done by the operator in the field in order to insure the greatest accuracy with respect to each installation.

At the upper portion of the yoke adaptor 23, in order to effect connection with whatever suitable driving means is employed whether it be gear- or motor-operated, the yoke adaptor 23 is provided with the flange portion 37 suitably drilled annularly and in spaced-apart relation as at 38 to receive the cap-screws 39 for effecting attachment to the mounting flange 41. The latter member has the depending portion 42 for receiving the attaching cap-screws 39. It will be appreciated that while the said mounting flange has been described as an independent removable member, there will be occasions when the member is either omitted or made integral as will be apparent. The driver- or gear-operator housing 43 is mounted in this installation positioned upon the mounting flange 41 and held in place by means of the cap-screws 44, all of which is in accordance with the structural arrangement shown and described in the previously mentioned Patent No. 3,115,787. As shown, the said driver housing 43 is fitted with the drive sleeve 45 in the same manner and functions similar to that described in said patent.

As previously stated, the adaptor member 17 is provided with the arcuately extending depending portion 21 (when viewed in plan) for predetermined rotative engagement with the lower depending arcuate portion 46 of the drive sleeve member 45, having the contact surface 50 for suitable abutting contact with the surface 40 of the arcuately extending lug 21 of the driven adaptor 17, after said predetermined rotation of the said drive sleeve. Again, as similarly described in connection with the said patent, the mounting of the drive sleeve 45 is effected in said housing in a similar manner relative to the gears within said housing.

In this connection, the description of the driving mechanism referred to is also in accordance with said Patents No. 3,034,371 as well as No. 3,115,787. It will be understood that the adaptor mechanism of this invention also permits the use of a motor driven actuating mechanism such as that shown and described in the U.S. patent application Serial No. 148,423, filed October 30, 1961, now Patent No. 3,234,818, entitled Valve Operating Mechanism, assigned to Crane Co. and commercially known by its Registered Trademark No. 724,173 "Crane Teledyne." Thus, it will be apparent that the adaptor of this invention possesses considerable versatility in permitting an option by the user either in employing a reducing gear operating unit, such as the Crane "Converto-Gear," Registration No. 715,415 or the "Teledyne" unit for motor driven installations as above referred to.

It should be appreciated that when the yoke adaptor is applied to the yoke as shown, it should be accurately centered and securely tightened before drilling for the groove pins. The number and positioning of the latter of course varies with the size of the unit selected.

Thus, a convenient and comparatively simple adaptor unit has been provided rendering easy operation of a valve either with a power unit or a gear reduction assembly of the order hereinabove referred to. Further, the valve may be conveniently converted with a minimum of skill and without the requirement of any special tools other than simple drilling and wrenches whereby to draw up the stud bolts and cap-screws after removing the usual valve handwheel from the yoke sleeve 6 and replacing it with the nut 14 to retain the yoke sleeve as previously described.

The adaptor unit of this invention provides for positive positioning with comparative simplicity in drawing the yoke adaptor 23 securely against the upper surface of the integral valve yoke.

It will be appreciated that while only a single embodiment has been shown and described this is solely for purpose of illustration and therefore the scope of the invention should be measured by the breadth of the appended claims.

We claim:

1. Adaptor connection means to a gear operator for a valve having an integral yoke and a non-rotatable rising stem comprising a rotatable yoke sleeve cooperating with the said stem, a yoke sleeve adaptor member mounted over the stem on the said yoke sleeve and revolvable about the stem central axis, the said valve yoke comprising a pair of ribbed depending yoke arms joined by a hollow yoke hub portion at the upper end thereof to enclose at least an outer peripheral portion of said yoke sleeve member, a driven adaptor received in non-rotatable relation on said yoke sleeve adaptor, a drive sleeve rotatably mounted above said yoke member having a lower cltuch portion engageable by a clutch portion on said yoke sleeve adaptor member, means for rotating said drive sleeve comprising a driven gear mounted on the said drive sleeve and rotatable therewith, a yoke adaptor for support of the gear operator thereon, the said yoke adaptor being mounted on the hub portion of said valve yoke member and enclosing said yoke sleeve adaptor member and said driven adaptor, said yoke adaptor having removable coupling means comprising a plurality of depending bolt studs with eyelet members at end portions thereof for effecting attachment of said yoke adaptor to the said valve yoke substantially at the juncture of the hub portion with said ribbed yoke arms, said coupling means including a pair of transversely extending bolt studs engaging said eyelet members and projecting through the ribs of said yoke arms whereby to effect attachment of the said yoke adaptor to the said valve yoke.

2. The subject matter of claim 1, the said yoke adaptor having at a lower portion thereof an inturned flange, and pin means interposed between said inturned flange and said yoke hub for effecting alignment of the latter members.

3. The subject matter of claim 2, said yoke adaptor having an outwardly extending flange on a lower portion thereof for support of said coupling means.

4. The subject matter of claim 2, said inturned flange having through-apertures to receive said interposed pin means whereby to permit said pin means to be limitedly movable axially when positioning the said yoke adaptor upon the yoke hub.

5. The subject matter of claim 4, the said yoke sleeve adaptor having transverse surface means to inhibit said axial movement of said pin means outwardly.

6. The subject matter of claim 1, one of each of said eyelet members being normally mounted on each side of the ribs of said depending yoke arms.

7. The subject matter of claim 6, spacer washer means between each of said eyelet members and said yoke arm ribs.

8. The subject matter of claim 1, the said yoke hub being received between said coupling means within a central apertured portion of said yoke adaptor.

9. The subject matter of claim 1, removable means on the said yoke sleeve for retaining said yoke sleeve adaptor to the said yoke.

10. The subject matter of claim 1, the said driven adaptor having a hollow lower portion of polygonal cross-section for receiving said yoke sleeve adaptor in said non-rotatable relation.

No references cited.

DAVID J. WILLIAMOWSKY, *Primary Examiner.*

L. H. GERIN, *Assistant Examiner.*